United States Patent
Sargaison et al.

(10) Patent No.: US 7,770,050 B2
(45) Date of Patent: Aug. 3, 2010

(54) METHOD AND APPARATUS FOR RESOLVING CLOCK MANAGEMENT ISSUES IN EMULATION INVOLVING BOTH INTERPRETED AND TRANSLATED CODE

(75) Inventors: Stewart Sargaison, Foster City, CA (US); Victor Suba, Foster City, CA (US); Brian Watson, Burlingame, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 566 days.

(21) Appl. No.: 11/696,699

(22) Filed: Apr. 4, 2007

(65) Prior Publication Data

US 2007/0277052 A1 Nov. 29, 2007

Related U.S. Application Data

(60) Provisional application No. 60/746,273, filed on May 3, 2006, provisional application No. 60/746,267, filed on May 3, 2006, provisional application No. 60/746,268, filed on May 3, 2006, provisional application No. 60/797,762, filed on May 3, 2006, provisional application No. 60/797,435, filed on May 3, 2006, provisional application No. 60/797,761, filed on May 3, 2006.

(51) Int. Cl.
*G06F 1/04* (2006.01)
(52) U.S. Cl. ............... 713/600; 713/400; 703/26
(58) Field of Classification Search ........... 713/400, 713/600; 703/26
See application file for complete search history.

(56) References Cited

U.S. PATENT DOCUMENTS

| 4,587,612 A | 5/1986 | Fisk et al. ............... 703/26 |
| 5,551,015 A | 8/1996 | Goettelmann et al. ....... 717/137 |

(Continued)

FOREIGN PATENT DOCUMENTS

EP    0945796    9/1999

(Continued)

OTHER PUBLICATIONS

U.S. Appl. No. 11/696,691, to Stewart Sargaison et al., entitled "Register Mapping in Emulation a Target System on a Host System" filed Apr. 4, 2007.

(Continued)

*Primary Examiner*—Chun Cao
(74) *Attorney, Agent, or Firm*—Joshua D. Isenberg; JDI Patent

(57) ABSTRACT

Methods and systems for resolving clock management issues in emulation of a target system on a host system are disclosed. A first set of code instructions of a target program is interpreted to generate interpreted code instructions that emulate a first component on the host system. A second set of code instructions is translated to generate translated code instructions that emulate a second component of the target system on the host system. The interpreted instructions, are executed based on a first clock (which may be a fixed clock) and the translated instructions are executed based on a second clock (which may be a variable clock). The host system adjusts the first or second clock, execution of the translated or interpreted instructions or a memory access to maintain a desired synchronization between the translated instructions and the interpreted instructions.

25 Claims, 5 Drawing Sheets

U.S. PATENT DOCUMENTS

| | | | |
|---|---|---|---|
| 5,560,013 | A | 9/1996 | Scalzi et al. |
| 5,649,203 | A | 7/1997 | Sites ........................ 717/156 |
| 5,768,593 | A | 6/1998 | Walters et al. |
| 5,815,720 | A | 9/1998 | Buzbee |
| 6,016,542 | A | 1/2000 | Gottlieb et al. |
| 6,031,992 | A | 2/2000 | Cmelik et al. |
| 6,047,381 | A * | 4/2000 | Klein ........................ 713/501 |
| 6,115,054 | A | 9/2000 | Giles |
| 6,151,670 | A | 11/2000 | Lange et al. ................ 712/228 |
| 6,158,047 | A | 12/2000 | Le et al. |
| 6,247,172 | B1 | 6/2001 | Dunn et al. |
| 6,314,560 | B1 | 11/2001 | Dunn et al. |
| 6,327,704 | B1 | 12/2001 | Mattson et al. |
| 6,332,214 | B1 | 12/2001 | Wu |
| 6,397,242 | B1 | 5/2002 | Devine et al. |
| 6,463,582 | B1 | 10/2002 | Lethin et al. |
| 6,502,237 | B1 | 12/2002 | Yates et al. |
| 6,529,862 | B1 | 3/2003 | Mann et al. .................. 703/26 |
| 6,532,532 | B1 | 3/2003 | Eaton et al. |
| 6,631,514 | B1 | 10/2003 | Le ............................ 717/137 |
| 6,672,963 | B1 | 1/2004 | Link .......................... 463/43 |
| 6,704,925 | B1 | 3/2004 | Bugnion |
| 6,763,328 | B1 | 7/2004 | Egolf et al. |
| 6,882,968 | B1 | 4/2005 | Linden |
| 6,884,171 | B2 | 4/2005 | Eck et al. ..................... 463/42 |
| 6,993,751 | B2 | 1/2006 | Bhansali et al. |
| 7,000,226 | B2 | 2/2006 | Gao et al. |
| 7,096,460 | B1 | 8/2006 | Banning et al. |
| 7,107,580 | B2 | 9/2006 | Zemach et al. |
| 7,117,143 | B2 * | 10/2006 | Wang et al. .................. 703/25 |
| 7,181,601 | B2 | 2/2007 | Rudd et al. |
| 7,210,144 | B2 | 4/2007 | Traut |
| 7,260,815 | B1 | 8/2007 | Chen et al. |
| 7,624,384 | B2 | 11/2009 | Zhang et al. |
| 2002/0066086 | A1 | 5/2002 | Linden ....................... 717/145 |
| 2002/0156977 | A1 | 10/2002 | Derrick et al. |
| 2003/0093649 | A1 | 5/2003 | Hilton |
| 2003/0093775 | A1 | 5/2003 | Hilton |
| 2004/0158681 | A1 | 8/2004 | Hooker |
| 2004/0205733 | A1 | 10/2004 | Souloglou et al. ........... 717/138 |
| 2004/0221273 | A1 | 11/2004 | Sandham |
| 2004/0221278 | A1 | 11/2004 | Dankel et al. |
| 2005/0015754 | A1 | 1/2005 | Werner et al. ............... 717/136 |
| 2005/0015756 | A1 | 1/2005 | Brown et al. |
| 2005/0015758 | A1 | 1/2005 | North |
| 2005/0149697 | A1 | 7/2005 | Enright et al. |
| 2006/0029234 | A1 | 2/2006 | Sargaison .................... 381/74 |
| 2006/0114132 | A1 | 6/2006 | Zhang et al. |
| 2007/0180438 | A1 | 8/2007 | Suba et al. .................. 717/151 |
| 2007/0260446 | A1 | 11/2007 | Suba et al. .................... 703/25 |
| 2007/0261038 | A1 | 11/2007 | Suba et al. .................. 717/136 |
| 2007/0261039 | A1 | 11/2007 | Sargaison et al. ........... 717/138 |
| 2008/0052691 | A1 | 2/2008 | Neelakantam et al. |
| 2008/0092151 | A1 | 4/2008 | Brown |

FOREIGN PATENT DOCUMENTS

WO    WO2007096602    8/2007

OTHER PUBLICATIONS

U.S. Appl. No. 60/746,273, entitled "Method and Apparatus for Resolving Clock Management Issues in the Emulation Involving Both Interpreted and Translated Code" filed May 3, 2006.

U.S. Appl. No. 60/746,267, to Stewart Sargaison, et al. "Translation Block Invalidation Prehints in Emulation of a Target System on a Host System", filed May 3, 2006.

U.S. Appl. No. 60/746,268, to Stewart Sargaison, et al. "Register Mapping in Emulation a Target System on a Host System", filed May 3, 2006.

U.S. Appl. No. 60/797,762, to Victor Suba, entitled "Stall Prediction Thread Management", filed May 3, 2006.

U.S. Appl. No. 60/797,435, to Victor Suba et al., entitled "DMA and Graphics Interface Emulation", filed May 3, 2006.

U.S. Appl. No. 60/797,761, to Victor Suba et al., entitled "Code Translation and Pipeline Optimization", filed May 3, 2006.

U.S. Appl. No. 60/763,568, to Victor Suba, entitled "Branch Prediction Thread Management" filed Jan. 30, 2006.

International Search Report and Written Opinion of the International Searching Authority—International application No. PCT/US07/67133.

Smelyanskiy M. et al :"Register Queues: A New Hardware/Software Approach to Efficient Software Pipelining"- IEEE, 2000, pp. 3-12.

Proebsting T. et al.: "Probabilistic Register Allocation", ACM SIGPLAN Notices, vol. 7, No. 7, Jul. 1, 1992, pp. 300-310.

European Search Report for European Application No. 07761060 (International application No. PCT/US2007/067142) dated Mar. 30, 2009, 8 pages.

European Search Report for European Application No. 07761064 (International application No. PCT/US2007/067146) dated Apr. 6, 2009, 7 pages.

Office Action dated Mar. 17, 2009 for U.S. Appl. No. 11/696,691.

Wang. ISSCC 2005—"The CELL Microprocessor Real World Technologies"—Feb. 2005, pp. 1-9.

International Search Report and Written Opinion of the International Searching Authority—International application No. PCT/US07/67142 dated May 21, 2008.

International Search Report and Written Opinion of the International Searching Authority dated Jul. 30, 2008—International Patent Application No. PCT/US07/67146.

"Energy-Efficient Design", Kunio Uchiyama, 2005 IEEE, pp. 6-9.

Office Action dated Sep. 17, 2008 for U.S. Appl. No. 11/696,691.

Zhu et al., "A Retargetable, Ultra-fast Instruction Set Simulator", 1999.

Office Action dated Dec. 23, 2009 issued for U.S. Appl. No. 11/696,691.

Office Action dated Oct. 6, 2009 issued for U.S. Appl. No. 11/696,684.

Kahle et al., "Introduction to the Cell Multiprocessor", IBM Journal of Research and Development, vol. 49, No. 4/5, Jul.-Sep. 2005, pp. 589-604.

Office Action dated Nov. 13, 2008 issued for U.S. Appl. No. 11/700,448.

Notice of Allowance and Fee(s) Due dated Apr. 21, 2009 issued for U.S. Appl. No. 11/700,448.

Eichenberger, A, E et al.—Optimizing Complier for a CELL Processor, 2005, IEEE, 12 pages.

McNairy, C et al.—Montecio: A Dual-Core, Dual Thread Itanium Processor, 2005, IEEE, pp. 10-20.

Notice of Allowance and Fee(s) dated Apr. 12, 2010 for U.S. Appl. No. 11/696,684.

Notice of Allowance and Fee(s) dated May 14, 2010 for U.S. Appl. No. 11/696,691.

* cited by examiner

METHOD AND APPARATUS FOR RESOLVING CLOCK MANAGEMENT ISSUES IN EMULATION INVOLVING BOTH INTERPRETED AND TRANSLATED CODE

CROSS-REFERENCE TO RELATED APPLICATION

This application claims the benefit of priority of U.S. provisional application No. 60/746,273, entitled METHOD AND APPARATUS FOR RESOLVING CLOCK MANAGEMENT ISSUES IN EMULATION INVOLVING BOTH INTERPRETED AND TRANSLATED CODE, filed May 3, 2006, the entire disclosures of which are incorporated herein by reference. This application claims the benefit of priority of U.S. provisional application No. 60/746,267, to Stewart Sargaison et al, entitled TRANSLATION BLOCK INVALIDATION PREHINTS IN EMULATION OF A TARGET SYSTEM ON A HOST SYSTEM, filed May 3, 2006, the entire disclosures of which are incorporated herein by reference. This application claims the benefit of priority of U.S. provisional application No. 60/746,268, to Stewart Sargaison et al, entitled REGISTER MAPPING IN EMULATION A TARGET SYSTEM ON A HOST SYSTEM, filed May 3, 2006, the entire disclosures of which are incorporated herein by reference. This application claims the benefit of priority of U.S. provisional application No. 60/797,762, to Victor Suba, entitled STALL PREDICTION THREAD MANAGEMENT, filed May 3, 2006, the entire disclosures of which are incorporated herein by reference. This application claims the benefit of priority of U.S. provisional application No. 60/797,435, to Stewart Sargaison et al, entitled DMA AND GRAPHICS INTERFACE EMULATION, filed May 3, 2006, the entire disclosures of which are incorporated herein by reference. This application also claims the benefit of priority of U.S. provisional application No. 60/797,761, to Stewart Sargaison et al, entitled CODE TRANSLATION AND PIPELINE OPTIMIZATION, filed May 3, 2006, the entire disclosures of which are incorporated herein by reference.

This application claims the benefit of priority of U.S. patent application Ser. No. 11/700,448, filed Jan. 30, 2007, which claims the benefit of priority of U.S. provisional patent application No. 60/763,568 filed Jan. 30, 2006. The entire disclosures of application Ser. Nos. 11/700,448 and 60/763,568 are incorporated herein by reference.

This application is related to commonly-assigned, co-pending application Ser. No. 11/696,684, to Stewart Sargaison et al, entitled TRANSLATION BLOCK INVALIDATION PREHINTS IN EMULATION OF A TARGET SYSTEM ON A HOST SYSTEM, filed the same day as the present application, the entire disclosures of which are incorporated herein by reference. This application is related to commonly-assigned, co-pending application Ser. No. 11/696,691, to Stewart Sargaison et al, entitled REGISTER MAPPING IN EMULATION A TARGET SYSTEM ON A HOST SYSTEM, filed the same day as the present application, the entire disclosures of which are incorporated herein by reference.

FIELD OF THE INVENTION

Embodiments of this invention relate to emulation of a target computer platform on a host computer platform and more particularly to clock management where certain components of the target platform are emulated by interpretation and other components are emulated by translation.

BACKGROUND OF THE INVENTION

The process of emulating the functionality of a first computer platform (the "target system") on a second computer platform (the "host system") so that the host system can execute programs designed for the target system is known as "emulation." Emulation has commonly been achieved by creating software that converts program instructions designed for the target platform (target code instructions) into the native-language of a host platform (host instructions), thus achieving compatibility. More recently, emulation has also been realized through the creation of "virtual machines," in which the target platform's physical architecture—the design of the hardware itself—is replicated via a virtual model in software.

Two main types of emulation strategies currently are available in the emulation field. The first strategy is known as "interpretation", in which each target code instruction is decoded in turn as it is addressed, causing a small sequence of host instructions then to be executed that are semantically equivalent to the target code instruction. The main component of such an emulator is typically a software interpreter that converts each instruction of any program in the target machine language into a set of instructions in the host machine language, where the host machine language is the code language of the host computer on which the emulator is being used. In some instances, interpreters have been implemented in computer hardware or firmware, thereby enabling relatively fast execution of the emulated programs.

The other main emulation strategy is known as "translation", in which the target instructions are analyzed and decoded. This is also referred to as "recompilation" or "cross-compilation". It is well known that the execution speed of computer programs is often dramatically reduced by interpreters. It is not uncommon for a computer program to run ten to twenty times slower when it is executed via emulation than when the equivalent program is recompiled into target machine code and the target code version is executed. Due to the well known slowness of software emulation, a number of products have successfully improved on the speed of executing source applications by translating portions of the target program at run time into host machine code, and then executing the recompiled program portions. While the translation process may take, e.g., 50 to 100 machine or clock cycles per instruction of the target code, the greater speed of the resulting host machine code is, on average, enough to improve the overall speed of execution of most source applications.

Whether the target code is interpreted or translated, it is likely that the host machine will execute the resulting interpreted or translated instructions at a different rate than the target machine would execute the original target instructions. Consequently, the host machine may run faster or slower than the target machine being emulated. Such differences in execution speed may be tolerable—or even desirable—in programs like word processors and spreadsheets. However, these differences in execution speed are a significant issue for timing-critical operations like: (1) sound and video playback; (2) processing "streaming" information, where data is delivered to the processor at a constant rate; and (3) games and animations which require screen updates to display motion accurately.

Different rates of execution for the target and host machines may be addressed in software, e.g., by adjusting the execution rate of the host machine. For example, U.S. Pat. No.

6,882,962 to Linden describes a method for simulating the timing characteristics of a target platform designed for consistent instruction execution speed by measuring, predicting and dynamically adjusting for timing variability within a host platform. This technique uses an arbitrary "time quantum" as a referent that is multiplied by the target system's instruction cycle execution speed to determine the number of instructions the target system executes in a specified time. When non-native code is executed on the host system, a counter is used to track the number of instructions executed and to interrupt when a target number is reached. A processor-activity-independent timing source is queried to determine the time elapsed. The elapsed time is then compared to the original "time quantum." The resulting ratio is a timing reference that is independent of the operating speed characteristics of any particular host system. This reference is used to predict the operational speed of the host system and to adjust factors in the host computer and emulation process to more accurately match the target system before executing the next block of instructions and repeating the process.

Although this system may work where the target instruction execution speed is consistent it does not address situations where different parts of the target system are emulated in different ways and have different clock rates. For example, one component of a target system may be emulated by interpretation, in which case the interpreted target instructions are run on the host system with a fixed clock. A different component of the target machine, however, may be emulated by translation, in which case the translated target instructions are run on the host system using a variable clock. Management of these two different clocks on the host system presents entirely different problems.

Thus, there is a need in the art, for emulation systems and methods that address these problems.

SUMMARY OF THE INVENTION

To overcome the above disadvantages, embodiments of the invention are directed to methods and systems for resolving clock management issues in emulation of a target system on a host system. A first set of code instructions of a target program is interpreted to generate interpreted code instructions that emulate a first component on the host system. A second set of code instructions is translated to generate translated code instructions that emulate a second component of the target system on the host system. The interpreted instructions are executed based on a first clock and the translated instructions are executed based on a second clock. The host system adjusts the first or second clock, execution of the translated or interpreted instructions or a memory access to maintain a desired synchronization between the translated instructions and the interpreted instructions.

For example, if the first clock is a fixed clock and the second clock is a variable clock, execution of the translated instructions or memory access may be held back when the second clock is running faster than the first clock. Alternatively, one or more of the clock rates may be adjusted based on an efficiency of use of some component of the target system by one or more portions of the target program. In a situation where there is not sufficient time for the host device to complete a translated instruction operation before a frame must be presented to a display device a current frame may be repeated to provide additional time to complete the translated instruction operation. In some embodiments, the execution of emulation of the target program may be altered in a way that avoids timing out if the target program polls a hardware register greater than a predetermined number of times. In other situations, one emulated component of the target system may write an instruction that is read by another component. These instructions may be stored in a journal and read from the journal in an order in which they were written to keep the reading component from passing the writing component.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

As described above, most emulation techniques involve either interpretation, using a fixed clock, or translation using a variable clock. In emulation of certain game console devices such as the Sony PlayStation®2 (PS2), certain target components are emulated by translation and others are emulated by translation. PlayStation is a registered trademark of Sony Computer Entertainment Corporation of Tokyo, Japan. Embodiments of the present invention address clock management issues that arise from the different types of emulation used to emulate different components of the target device.

Figure 1A:
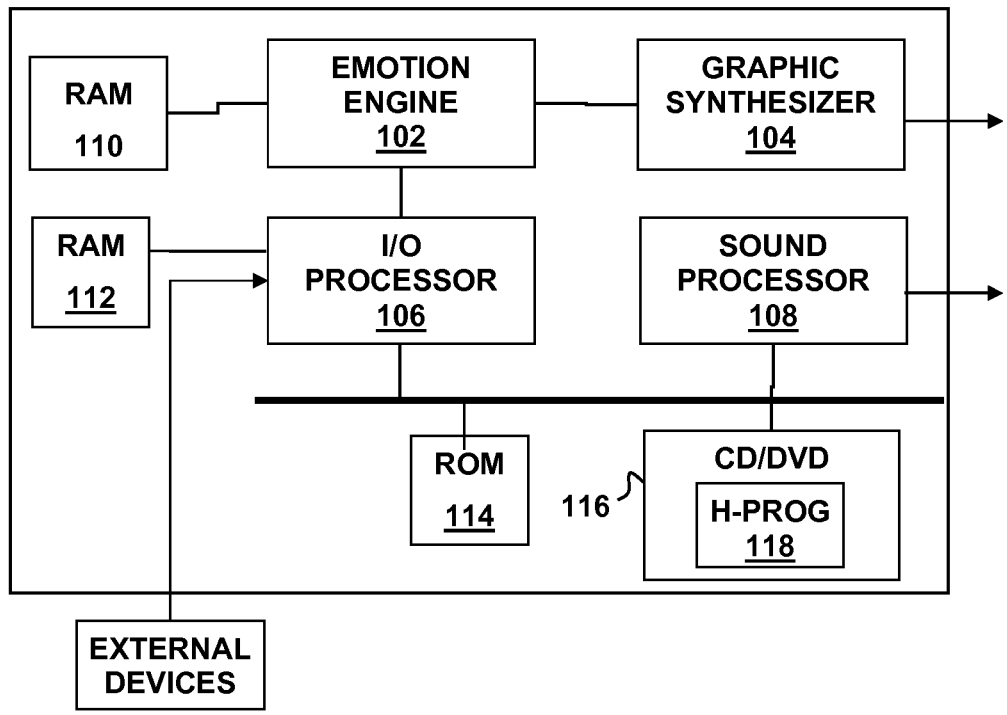
FIG. 1A is a block diagram of a target device that is to be emulated according to an embodiment of the present invention.

By way of example FIG. 1A depicts a block diagram of a target system 100 in the form of a game console device. The target system is built around a main processor module 102 referred to as an emotion engine, a Graphic Synthesizer 104, an input/output (I/O) processor (IOP) 106 and a sound processor unit 108. The emotion engine 102 typically includes a CPU core, co-processors and a system clock and has an associated random access memory (RAM) 110. The emotion engine 102 performs animation calculation, traverses a scene and converts it to a two-dimensional image that is sent to the Graphic Synthesizer (GS) 104 for rasterization.

Figure 1B:
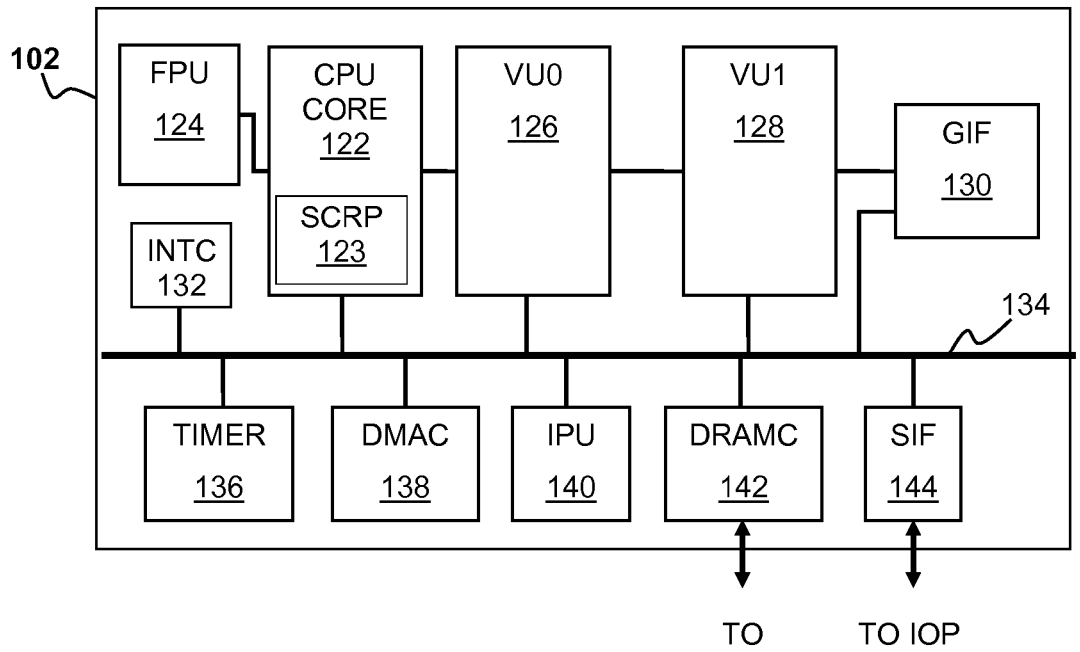
FIG. 1B is a block diagram of an emotion engine of the target device of FIG. 1A.

As shown in FIG. 1B, the EE 102 includes a CPU core 122, with an associated floating point unit (FPU) coprocessor 124, first and second vector co-processors 126, 128, a graphics interface controller 130 and an interrupt controller (INTC) 132. The CPU 122, vector co-processors 126, 128, GIF 130 and INTC 132 are coupled to a 128-bit main bus 134. The FPU 124 is directly coupled to the CPU 122. The CPU 122 is coupled to a first vector co-processor (VU0) 126, which is, in turn, coupled to a second vector co-processor (VU1) 128. The second vector co-processor VU1 128 is coupled to a graphics interface (GIF) 130. The EE 102 additional includes a timer 136, a direct memory access controller (DMAC) 138, an image data decompression processor (IPU) 140 a DRAM controller 142 and a sub-bus interface (SIF) 144 that facilitates communication between the EE 102 and the IOP 106.

The CPU core 122 may be a 128-bit processor operating at a 300 megahertz clock frequency using a MIPS instruction set with 64-bit instructions operating as a 2-way superscalar with 128-bit multimedia instructions. The CPU 122 may include a data cache, an instruction cache and an area of on-chip memory 123 sometimes referred to as a scratchpad. The scratchpad 123 serves as a small local memory that is available so that the CPU 122 can perform certain operations while the main bus 134 is busy transferring code and/or data. The first vector unit 126 may be used for animation and physics calculations. The second vector unit 128 may be used for geometry transformations. The GIF 130 serves as the main interface between the EE 102 and the GS 104.

The IOP 106 may include a processor for backwards compatibility with prior versions of the target system 100 and its own associated RAM 112. The IOP 106 handles input and output from external devices such as controllers, USB devices, a hard disc, Ethernet card or modem, and other components of the system such as the sound processor unit 108, a ROM 114 and a CD/DVD unit 116. A target program 118 may be stored on a CD/ROM disc loaded in the CD/DVD unit 116. Instructions from the target program 118 may be stored in EE RAM 110 or IOP RAM 112 and executed by the various processors of the target system 100 in a native machine code that can be read by these processors.

Figure 2A:
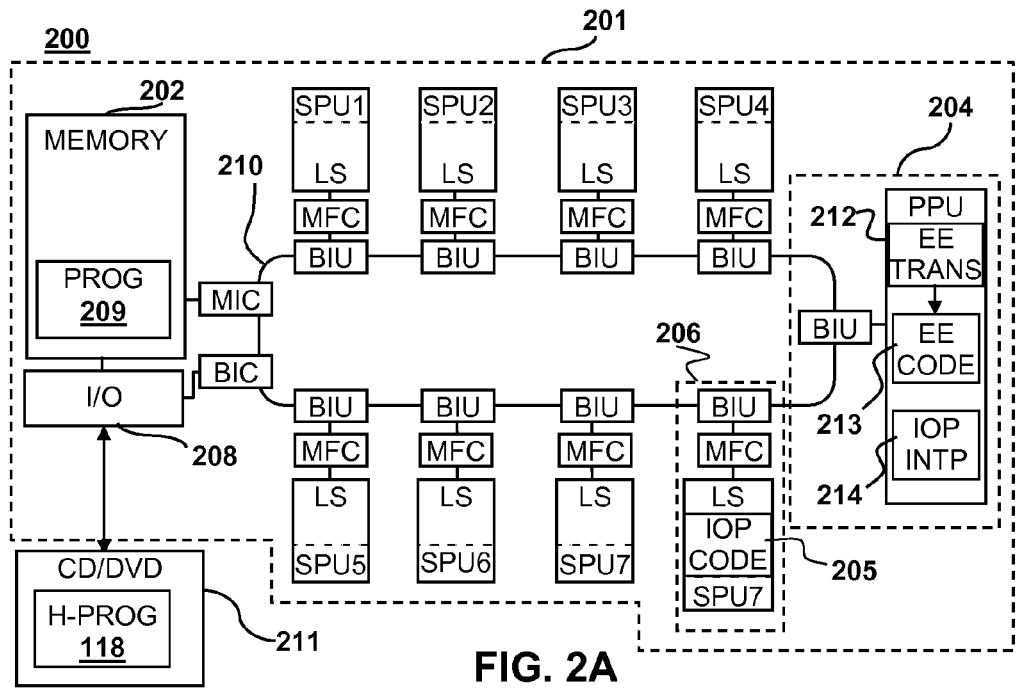
FIG. 2A is a schematic diagram of a host device that emulates the target device of FIGS. 1A-1B.

In embodiments of the present invention, the target system 100 may be emulated using a parallel processing host system 200 so that the host system 200 can run programs written in code native to the target system 100 such as target program 118. FIG. 2A depicts an example of a host system 200 based on a cell processor 201 that may be configured to emulate the target system 100. The cell processor 201 includes a main memory 202, a single power processor element (PPE) 204 and eight synergistic processor elements (SPE) 206. However, the cell processor 201 may be configured with more than one PPE and any number of SPE's. Each SPE 206 includes a synergistic processor unit (SPU) and a local store (LS). The memory 202, PPE 204, and SPEs 206 can communicate with each other and with an I/O device 208 over a ring-type element interconnect bus (EIB) 210. The PPE 204 and SPEs 206 can access the EIB 210 through bus interface units (BIU). The PPE 204 and SPEs 206 can access the main memory 202 over the EIB 210 through memory flow controllers (MFC). The memory 202 may contain an emulation program 209 that implements interpretation and translation of coded instructions written for the target system 100. These coded instructions may be read from a CD/ROM disc in a CD/DVD reader 211 coupled to the I/O device 208. A CD/ROM disc containing the target program 118 may be loaded into the CD/DVD reader 211. At least one of the SPE 206 receives in its local store emulated IOP code 205 having instructions that emulate the IOP 106 described above with respect to FIGS. 1A-1B.

By way of example, in an embodiment of the invention, a translator 212 running on the PPE 204 may emulate the EE 102 of the target system 100 by translating EE instructions of the target program 118 into machine code 213 that can be run on the PPE 204. The translated code 213 uses a variable clock. In this embodiment of the invention the PPE 204 implements an interpreter 214 that emulates the IOP 106 by interpreting IOP instructions of the target program 118. The interpreter 214 is run using a fixed clock. On the target system 100, the IOP clock rate may be significantly less (e.g., about $1/100^{th}$ of) the clock rate for the cell processor 201. As a result, some translated EE code may run too fast and some may run too slow. In addition, some programs written for the target system 100 may have different efficiencies of using the EE 102. As a result, different parts of the emulated program may run too fast or too slow.

Figure 2B:
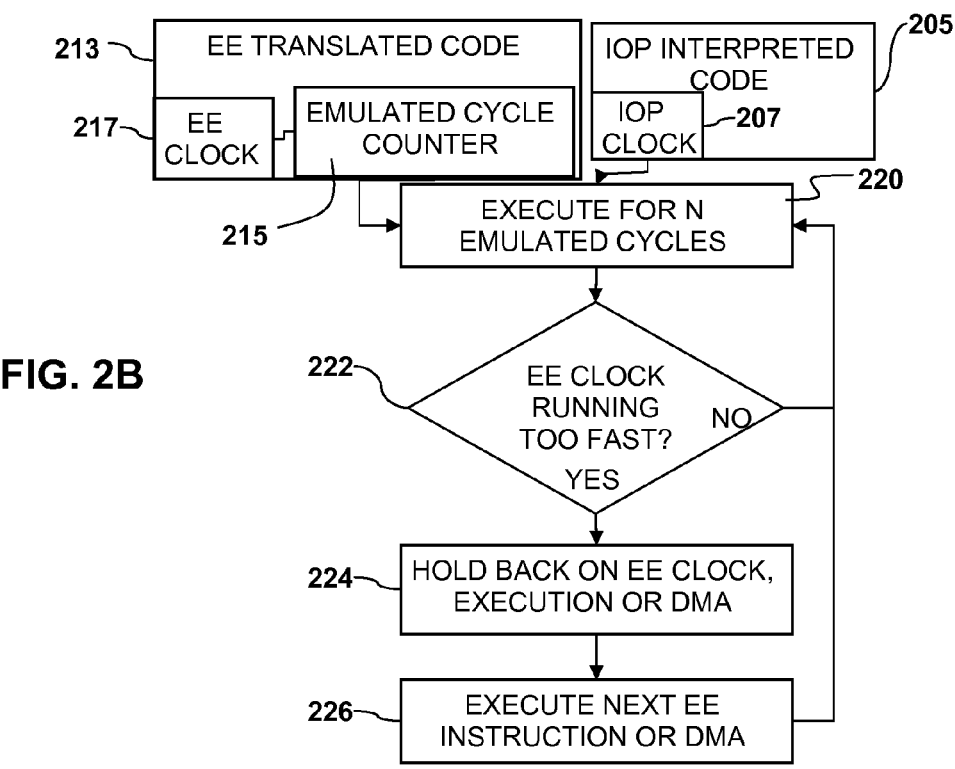
FIG. 2B is a flow diagram illustrating management of different clock rates for emulation of different parts of the target device according an embodiment of the present invention.

This program 209 can address the different clock rates by holding back execution or direct memory access (DMA) when the EE clock is running too fast (i.e., faster than the IOP clock) in order to synchronize the IOP and EE clocks. For example, as depicted in FIG. 2B, the translated EE code 213 may use an emulated cycle counter 215 to estimate how long an operation will take. The timing of the execution of translated EE code instructions is keyed to a variable EE clock 217. Similarly, the timing of the execution of interpreted IOP code 205 is keyed to a fixed IOP clock 207. The program 209 executes for some number N of emulated cycles as indicated at 220. After executing for N cycles, the program 209 can check to see if the IOP clock 207 and EE clock 217 are synchronized. For example, at 222 the program 209 may check to see if the EE clock 217 is running faster than the IOP clock 207. If not, normal execution may proceed for another N cycles. If so, the program 209 can hold back the EE clock as indicated at 224, e.g., by inserting a number of "no operation" (NOP) instructions into the translated code before executing the next EE or DMA instruction as indicated at 226.

Figure 2C:
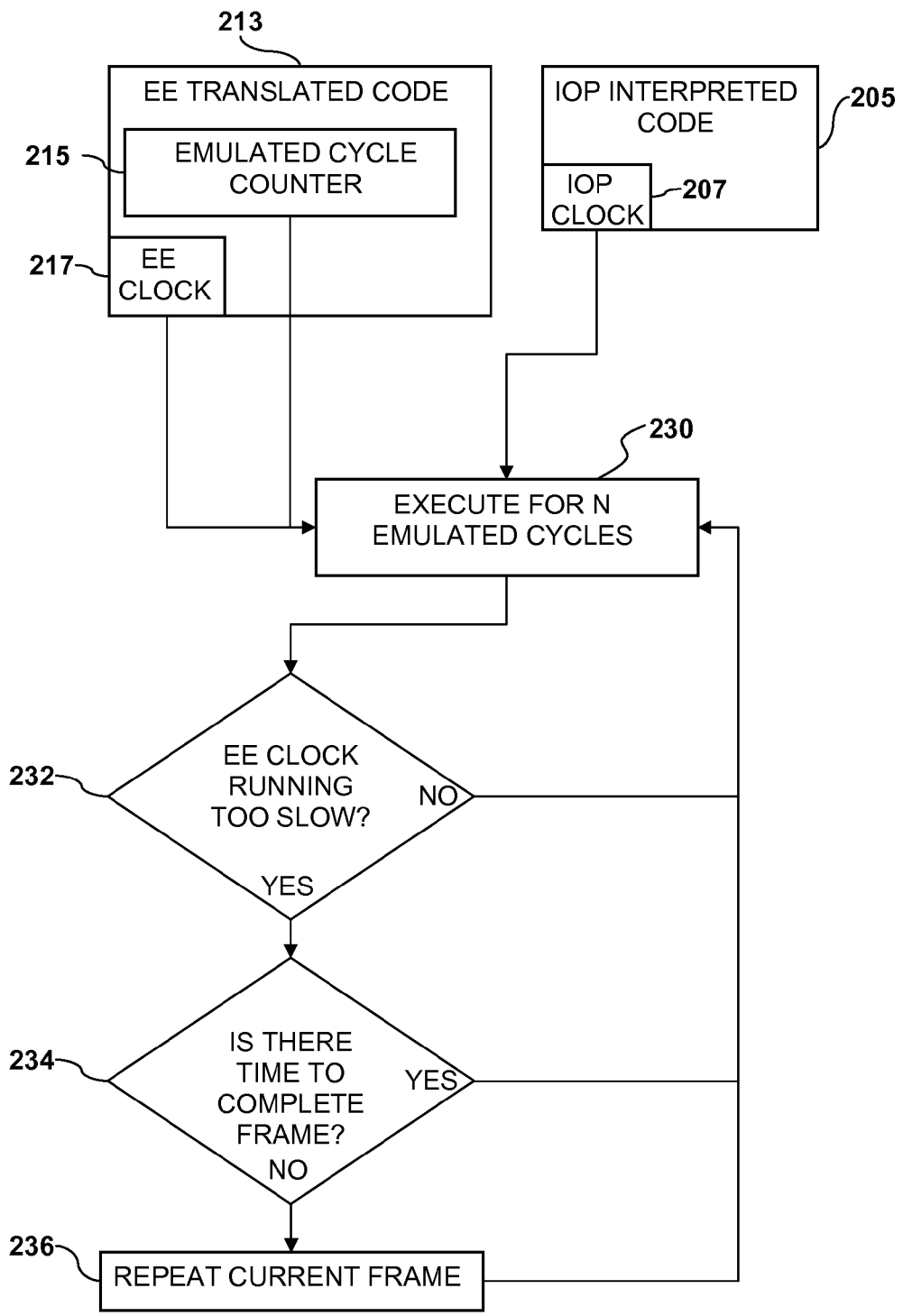
FIG. 2C is a flow diagram illustrating management of different clock rates for emulation of different parts of the target device according an alternative embodiment of the present invention.

In some situations there may not sufficient time for the translated code 213 to complete an EE operation before a frame must be presented to a display device such as a CRT monitor, television or the like. As shown in FIG. 2C, the program 209 running on the host system 200 may determine at 232 if the EE clock is too slow. If it is and if, at 234 it is determined that there is not enough time to complete the frame being processed repeat a frame at 236, e.g., the current frame, i.e., the frame currently being presented to the screen or the frame most recently presented, to provide additional time to make up for slower execution of the translated EE code 213.

Figure 3:
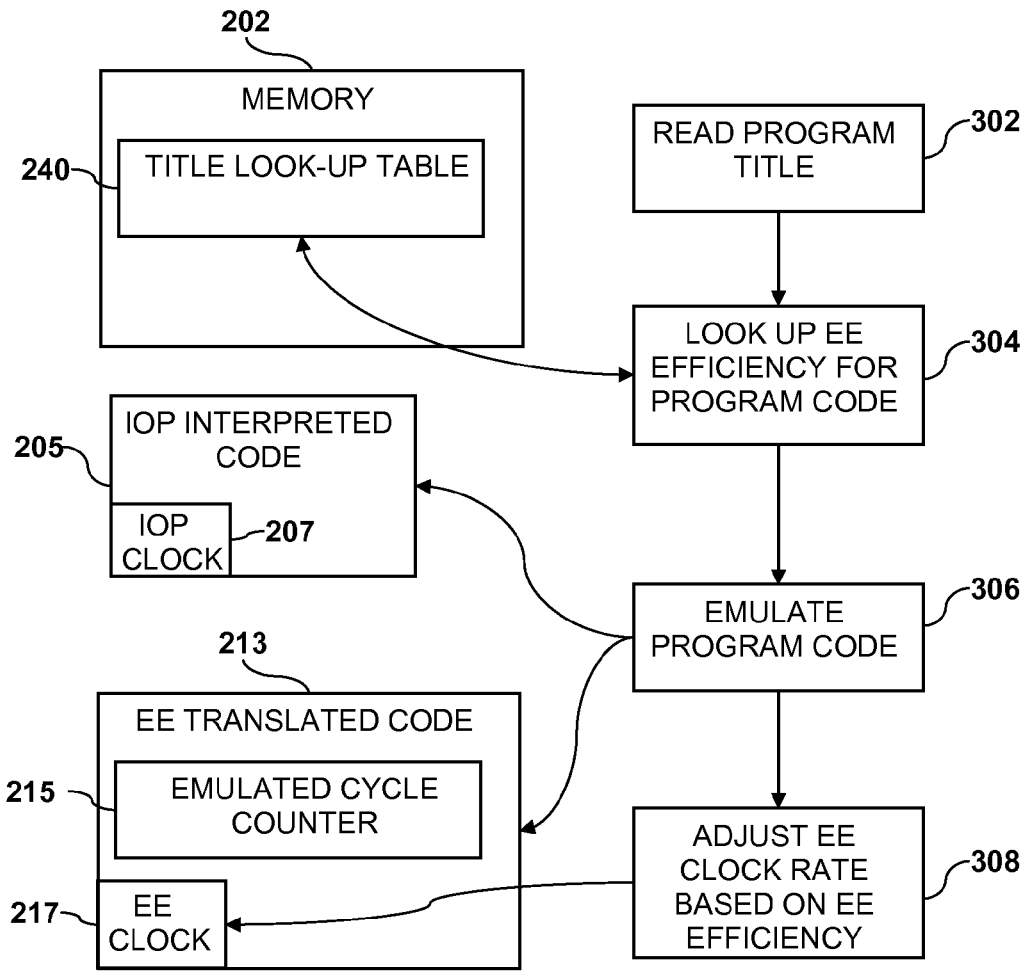
FIG. 3 is a flow diagram illustrating management of different clock rates for emulation of different parts of the target device according another alternative embodiment of the present invention.

In certain embodiments of the invention, the code for a given target program title may be analyzed for EE use efficiency and the EE clock rate may be adjusted based on the efficiency for different parts of the code. For example as shown in FIG. 3 the memory 202 may contain a look-up table 240 containing EE efficiency data for different programs that can be run on the target system 100. Since different parts of a program may use the EE with different efficiencies, the EE efficiency data for a given program may include multiple entries with each entry pertaining to a different part of the program. The data for the look-up table 240 may be generated by analyzing known target system programs for efficiency. In the particular case of programs for a game console, such as the Sony Playstation®2, an EE analyzer may be used to determine the efficiency of EE use for the various sections of the target system program 118.

The program 209 may make use of the data in the look-up table as shown at the right-hand side of FIG. 3. Specifically, the program 209 may read the title of a target system program (e.g., a game title from a game CD in the CD/DVD reader 211) as indicated at 302. Based on the title, the program 209 may then look-up the EE efficiency for one or more sections of the target system program, as indicated at 304. The program 209 may execute emulation of the host machine program as indicated at 306 using the interpreted IOP code 205, fixed IOP clock 207, translated EE code 213, and variable EE clock 217 described above. The emulation program 209 may adjust the clock rate for the EE clock 217 based on the EE efficiency for a portion of the target system program as indicated at 308. For example, if a section of the target system program has a relatively high efficiency the EE clock rate may be increased for those sections. Similarly, the EE clock rate may be correspondingly reduced for sections of the target system program having low EE efficiency.

During emulation of certain hardware there is a possibility that certain events may time out due to a difference in clock rates between the target system 100 and the host system 200. For example some target system programs may often set a value in a control register and then poll it repeatedly to wait for a result. Such programs may include time-out code that indicates a hardware error if the polling is unsuccessful after a given number of tries. However, if the target program 118 runs much faster on the host system 200, this count may be exceeded during emulation even though there is no hardware error.

Figure 4:
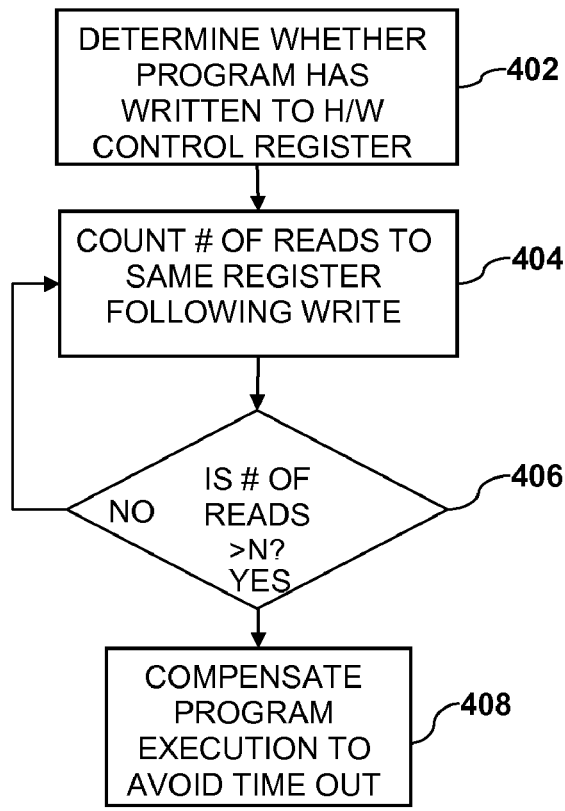
FIG. 4 is a flow diagram illustrating time out tracking control for emulation of the target device according another alternative embodiment of the present invention.

The emulation program 209 may include hardware emulation code, i.e., software code that emulates certain hardware on the target system 100. The hardware emulation code can include a time-out tracking control that determines if a time-out hazard exists and compensates for the hazard by altering the execution of the emulation of the target program 118 in a way that avoids timing out. An example of a time-out tracking control method 400, is illustrated e.g., in FIG. 4. At 402 it is determined whether the target program 118 has written to a hardware control register. For example, a memory mapped read to H/W, e.g., using memory-mapped I/O (MMIO) may be used as an indication that the target program 118 has written to a hardware control register. A count may be kept on the number of successive reads to the same register as indicated at 404. By way of example, certain registers in the EE components, such as the vector co-processor units 126, 128 and the IPU 140, can use time-out tracking. If at 406 the number of successive reads exceeds a threshold of N reads (e.g. 50 reads after a single write), the hardware emulation code determines that the host system software is trying to poll this register. In response, the hardware emulation code compensates to prevent timing out, as indicated at 408. For example the hardware emulation code may slow down by a sufficient margin to prevent the host system software from reaching a time-out. Alternatively, the hardware emulation code does not return any response to the emulated host system software until the hardware state changes (e.g. the emulated hardware has finished the requested operation).

Alternatively, a relevant section of the target program 118 can be analyzed to determine whether a polling operation is occurring (as exhibited, e.g., by the presence of short loops of code) as distinguished from do-nothing timing loops and memory copy operations that do not present a time-out hazard. While time-out tracking is engaged, the emulated hardware may still perform unrelated functions, such as interrupt handling.

On the target system 100, the EE 102 may read from one device and write to another device. For example the EE 102 may read data from the IOP 106, process the data and write processed results to the GS 104. In emulation of such an operation on the host system 200 it is important to keep the reader from passing the writer. If the part of the emulation program 209 emulating the read operation stalls, the part of the program 209 emulating the writing operation needs to know where the stall is. On the target system 100, devices that read or write to EE RAM 110, scratch pad 123, IPU 140 and SIF 144, can tell the other devices where the stall address is.

Figure 5:
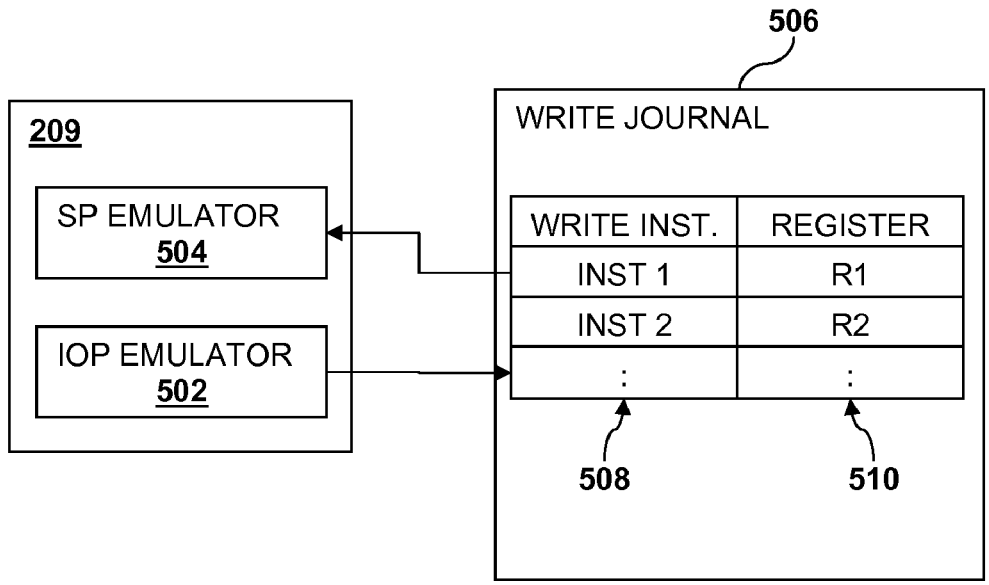
FIG. 5 is a flow diagram illustrating the use of a read/write journal in emulation according to an embodiment of the present invention.

For example, as illustrated in FIG. 5, when an IOP emulator 502 writes instructions to a sound processor emulator 504 the timing and order of write instructions is important to the sound processor emulator 504. Instructions that the IOP emulator 502 writes to the sound processor emulator 504 are stored in a write "journal" 506 that records order of all sound processor write instructions 508 and sound processor register values 510. The sound processor emulator 504 pulls the write instructions 508 in order from journal 506 along with the corresponding register values 510. By pulling the write instructions 508 from the journal 506 in the order that they were written, the reader (in this case the sound processor) does not get ahead of the writer (the IOP). The concept illustrated in FIG. 5 can be generally applied to any pair of emulated components of the target system 100 where one component writes data or instructions that the other reads. By way of example, the IOP emulator 502 and the sound processor emulator 504 may be implemented by SPEs 206 on the cell processor 201 described above with respect to FIG. 2A.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for resolving clock management issues in emulation of a target system on a host system, the method comprising:

interpreting a first set of code instructions of a target program to generate interpreted code instructions that emulate a first component of the target system on the host system;

translating a second set of code instructions to generate translated code instructions that emulate a second component of the target system on the host system;

executing the interpreted instructions, wherein execution of the interpreted instructions is based on a first clock;

executing the translated instructions, wherein execution of the translated instructions is based on a second clock; and adjusting the first or second clock, an execution of the translated or interpreted instructions or a memory access to maintain a desired synchronization between the translated instructions and the interpreted instructions.

2. The method of claim 1 wherein the first clock is a fixed clock and the second clock is a variable clock.

3. The method of claim 2 wherein adjusting the first or second clock, rate of execution of the translated or interpreted instructions or memory access includes holding back execution of the translated instructions or memory access when the second clock is running faster than the first clock.

4. A method for resolving clock management issues in emulation of a target system on a host system, the method comprising:
   interpreting a first set of code instructions of a target program to generate interpreted code instructions that emulate a first component of the target system on the host system;
   translating a second set of code instructions to generate translated code instructions that emulate a second component of the target system on the host system wherein the translated instructions use an emulated cycle counter to estimate how long an operation will take;
   executing the interpreted instructions, wherein execution of the interpreted instructions is based on a first clock wherein the first clock is a fixed clock;
   executing the translated instructions, wherein execution of the translated instructions is based on a second clock, wherein the second clock is a variable clock; and
   adjusting the first or second clock, an execution of the translated or interpreted instructions or a memory access to maintain a desired synchronization between the translated instructions and the interpreted instructions.

5. The method of claim 4 wherein timing of the execution of the translated instructions is keyed to the variable clock and timing of the execution of interpreted code is keyed to the fixed clock.

6. The method of claim 4 wherein holding back execution of the translated instructions or memory access when the second clock is running faster than the first clock includes executing a predetermined number of emulated cycles as indicated, checking to see if the variable clock is running faster than the fixed clock; and if the variable clock is running faster than the fixed clock, holding back the variable clock.

7. The method of claim 1 wherein the host system includes a cell processor having a power processor element and a plurality of synergistic processor elements coupled to the power processor element.

8. The method of claim 1 wherein the first component is an emotion engine and the second component is an input/output processor coupled to the emotion engine.

9. A method for resolving clock management issues in emulation of a target system on a host system, the method comprising:
   interpreting a first set of code instructions of a target program to generate interpreted code instructions that emulate a first component of the target system on the host system;
   translating a second set of code instructions to generate translated code instructions that emulate a second component of the target system on the host system;
   executing the interpreted instructions, wherein execution of the interpreted instructions is based on a first clock;
   executing the translated instructions, wherein execution of the translated instructions is based on a second clock; and
   adjusting the first or second clock, an execution of the translated or interpreted instructions or a memory access to maintain a desired synchronization between the translated instructions and the interpreted instructions, wherein, in a situation where there is not sufficient time for the host device to complete a translated instruction operation before a frame must be presented to a display device, adjusting the first or second clock, an of execution of the translated or interpreted instructions or a memory access to maintain a desired synchronization between the translated instructions and the interpreted instructions includes repeating a current frame to provide additional time to complete the translated instruction operation.

10. A method for resolving clock management issues in emulation of a target system on a host system, the method comprising:
    interpreting a first set of code instructions of a target program to generate interpreted code instructions that emulate a first component of the target system on the host system;
    translating a second set of code instructions to generate translated code instructions that emulate a second component of the target system on the host system;
    executing the interpreted instructions, wherein execution of the interpreted instructions is based on a first clock;
    executing the translated instructions, wherein execution of the translated instructions is based on a second clock; and
    adjusting the first or second clock, an execution of the translated or interpreted instructions or a memory access to maintain a desired synchronization between the translated instructions and the interpreted instructions, wherein adjusting the first or second clock, an of execution of the translated or interpreted instructions or a memory access to maintain a desired synchronization between the translated instructions and the interpreted instructions includes:
       looking up an efficiency of use of the second component by one or more portions of the target program and adjusting the second clock rate based on the efficiency of use.

11. A method for resolving clock management issues in emulation of a target system on a host system, the method comprising:
    interpreting a first set of code instructions of a target program to generate interpreted code instructions that emulate a first component of the target system on the host system;
    translating a second set of code instructions to generate translated code instructions that emulate a second component of the target system on the host system;
    executing the interpreted instructions, wherein execution of the interpreted instructions is based on a first clock;
    executing the translated instructions, wherein execution of the translated instructions is based on a second clock; and
    adjusting the first or second clock, an execution of the translated or interpreted instructions or a memory access to maintain a desired synchronization between the translated instructions and the interpreted instructions, wherein adjusting the first or second clock, an of execution of the translated or interpreted instructions or a memory access to maintain a desired synchronization between the translated instructions and the interpreted instructions includes:
       determining whether an emulated event may time out due to a difference in between a rate of the first clock and a rate of the second clock; and
       adjusting the first clock rate or execution of the translated instructions to avoid a time-out of the emulated event.

12. The method of claim 11 wherein determining whether an emulated event may time out due to a difference in between a rate of the first clock and a rate of the second clock includes detecting whether the target program has set a value in a control register and then polled the control register repeatedly to wait for a result.

13. The method of claim 12 wherein adjusting the first clock rate or execution of the translated instructions to avoid the time out includes:
   altering the execution of emulation of the target program in a way that avoids timing out if the target program polls the register greater than a predetermined number of times.

14. The method of claim 13 wherein altering the execution of emulation of the target program includes slowing down the emulation by a sufficient margin to prevent the time-out.

15. The method of claim 13 wherein altering the execution of emulation of the target program includes not returning any response to the emulated target program until a hardware state changes.

16. The method of claim 13 wherein altering the execution of emulation of the target program includes analyzing a relevant section of the target program to determine whether a polling operation is occurring.

17. The method of claim 12, further comprising further comprising performing functions unrelated to the time-out with emulated hardware while adjusting the first clock rate or execution of the translated instructions to avoid a time-out of the emulated event.

18. A method for resolving clock management issues in emulation of a target system on a host system, the method comprising:
   interpreting a first set of code instructions of a target program to generate interpreted code instructions that emulate a first component of the target system on the host system;
   translating a second set of code instructions to generate translated code instructions that emulate a second component of the target system on the host system;
   executing the interpreted instructions, wherein execution of the interpreted instructions is based on a first clock;
   executing the translated instructions, wherein execution of the translated instructions is based on a second clock; and
   adjusting the first or second clock, an execution of the translated or interpreted instructions or a memory access to maintain a desired synchronization between the translated instructions and the interpreted instructions,
   wherein executing the translated and/or interpreted instructions includes writing one or more write instructions from a first emulated device and reading the one or more write instructions with a second emulated device, wherein adjusting the first or second clock, an of execution of the translated or interpreted instructions or a memory access to maintain a desired synchronization between the translated instructions and the interpreted instructions includes:
      storing the one or more write instructions in a journal in an order in which they were written and reading the one or more write instructions with the second emulated device in the order in which they were written.

19. A host system for emulating a target system, comprising:
   one or more processors;
   a memory coupled to the one or more processors;
   a set of processor executable instructions embodied in the memory, the processor executable instructions including instructions for implementing method for resolving clock management issues in emulation of the target system on the host system, the method including:
      interpreting a first set of code instructions of a target program to generate interpreted code instructions that emulate a first component of the target system on the host system;
      translating a second set of code instructions to generate translated code instructions that emulate a second component of the target system on the host system;
      executing the interpreted instructions, wherein execution of the interpreted instructions is based on a first clock;
      executing the translated instructions, wherein execution of the translated instructions is based on a second clock; and
      adjusting the first or second clock, an of execution of the translated or interpreted instructions or a memory access to maintain a desired synchronization between the translated instructions and the interpreted instructions.

20. The system of claim 19 wherein the host system includes a cell processor having a power processor element and a plurality of synergistic processor elements coupled to the power processor element.

21. A host system for emulating a target system, comprising:
   one or more processors;
   a memory coupled to the one or more processors;
   a set of processor executable instructions embodied in the memory, the processor executable instructions including instructions for implementing method for resolving clock management issues in emulation of the target system on the host system, the method including:
      interpreting a first set of code instructions of a target program to generate interpreted code instructions that emulate a first component of the target system on the host system;
      translating a second set of code instructions to generate translated code instructions that emulate a second component of the target system on the host system wherein the translated instructions use an emulated cycle counter to estimate how long an operation will take;
      executing the interpreted instructions, wherein execution of the interpreted instructions is based on a first clock wherein the first clock is a fixed clock;
      executing the translated instructions, wherein execution of the translated instructions is based on a second clock, wherein the second clock is a variable clock; and
      adjusting the first or second clock, an of execution of the translated or interpreted instructions or a memory access to maintain a desired synchronization between the translated instructions and the interpreted instructions.

22. A host system for emulating a target system, comprising:
   one or more processors;
   a memory coupled to the one or more processors;
   a set of processor executable instructions embodied in the memory, the processor executable instructions including instructions for implementing method for resolving clock management issues in emulation of the target system on the host system, the method including:
      interpreting a first set of code instructions of a target program to generate interpreted code instructions that emulate a first component of the target system on the host system;
      translating a second set of code instructions to generate translated code instructions that emulate a second component of the target system on the host system wherein the translated instructions use an emulated cycle counter to estimate how long an operation will take;

executing the interpreted instructions, wherein execution of the interpreted instructions is based on a first clock;

executing the translated instructions, wherein execution of the translated instructions is based on a second clock; and adjusting the first or second clock, an execution of the translated or interpreted instructions or a memory access to maintain a desired synchronization between the translated instructions and the interpreted instructions, wherein, in a situation where there is not sufficient time for the host device to complete a translated instruction operation before a frame must be presented to a display device, adjusting the first or second clock, an of execution of the translated or interpreted instructions or a memory access to maintain a desired synchronization between the translated instructions and the interpreted instructions includes repeating a current frame to provide additional time to complete the translated instruction operation.

23. A host system for emulating a target system, comprising:

one or more processors;

a memory coupled to the one or more processors;

a set of processor executable instructions embodied in the memory, the processor executable instructions including instructions for implementing method for resolving clock management issues in emulation of the target system on the host system, the method including:

interpreting a first set of code instructions of a target program to generate interpreted code instructions that emulate a first component of the target system on the host system;

translating a second set of code instructions to generate translated code instructions that emulate a second component of the target system on the host system wherein the translated instructions use an emulated cycle counter to estimate how long an operation will take;

executing the interpreted instructions, wherein execution of the interpreted instructions is based on a first clock;

executing the translated instructions, wherein execution of the translated instructions is based on a second clock; and adjusting the first or second clock, an execution of the translated or interpreted instructions or a memory access to maintain a desired synchronization between the translated instructions and the interpreted instructions, wherein adjusting the first or second clock, an of execution of the translated or interpreted instructions or a memory access to maintain a desired synchronization between the translated instructions and the interpreted instructions includes:

looking up an efficiency of use of the second component by one or more portions of the target program and adjusting the second clock rate based on the efficiency of use.

24. A host system for emulating a target system, comprising:

one or more processors;

a memory coupled to the one or more processors;

a set of processor executable instructions embodied in the memory, the processor executable instructions including instructions for implementing method for resolving clock management issues in emulation of the target system on the host system, the method including:

interpreting a first set of code instructions of a target program to generate interpreted code instructions that emulate a first component of the target system on the host system;

translating a second set of code instructions to generate translated code instructions that emulate a second component of the target system on the host system wherein the translated instructions use an emulated cycle counter to estimate how long an operation will take;

executing the interpreted instructions, wherein execution of the interpreted instructions is based on a first clock;

executing the translated instructions, wherein execution of the translated instructions is based on a second clock; and adjusting the first or second clock, an execution of the translated or interpreted instructions or a memory access to maintain a desired synchronization between the translated instructions and the interpreted instructions, wherein adjusting the first or second clock, an of execution of the translated or interpreted instructions or a memory access to maintain a desired synchronization between the translated instructions and the interpreted instructions includes:

determining whether an emulated event may time out due to a difference in between a rate of the first clock and a rate of the second clock; and adjusting the first clock rate or execution of the translated instructions to avoid a time-out of the emulated event.

25. A host system for emulating a target system, comprising:

one or more processors;

a memory coupled to the one or more processors;

a set of processor executable instructions embodied in the memory, the processor executable instructions including instructions for implementing method for resolving clock management issues in emulation of the target system on the host system, the method including:

interpreting a first set of code instructions of a target program to generate interpreted code instructions that emulate a first component of the target system on the host system;

translating a second set of code instructions to generate translated code instructions that emulate a second component of the target system on the host system wherein the translated instructions use an emulated cycle counter to estimate how long an operation will take;

executing the interpreted instructions, wherein execution of the interpreted instructions is based on a first clock;

executing the translated instructions, wherein execution of the translated instructions is based on a second clock; and adjusting the first or second clock, an execution of the translated or interpreted instructions or a memory access to maintain a desired synchronization between the translated instructions and the interpreted instructions, wherein executing the translated and/or interpreted instructions includes writing one or more write instructions from a first emulated device and reading the one or more write instructions with a second emulated device, wherein adjusting the first or second clock, an of execution of the translated or interpreted instructions or a memory access to maintain a desired synchronization between the translated instructions and the interpreted instructions includes:

storing the one or more write instructions in a journal in an order in which they were written and reading the one or more write instructions with the second emulated device in the order in which they were written.

* * * * *